(12) United States Patent
Smith

(10) Patent No.: US 6,544,618 B1
(45) Date of Patent: Apr. 8, 2003

(54) THERMALLY REFLECTIVE LAYER-POROUS METAL OXIDE FILM INSULATION COMPOSITE

(75) Inventor: Douglas M. Smith, Albuquerque, NM (US)

(73) Assignee: Cabot Corporation, Boston, MA (US)

( * ) Notice: Subject to any disclaimer, the term of this patent is extended or adjusted under 35 U.S.C. 154(b) by 0 days.

(21) Appl. No.: 09/306,126

(22) Filed: May 6, 1999

(51) Int. Cl.$^7$ ................................................. B32B 5/16
(52) U.S. Cl. .................... 428/69; 428/36.91; 428/36.98; 428/68; 428/74; 428/75; 428/138; 428/213; 428/215; 428/457; 428/469
(58) Field of Search .............................. 428/68, 69, 74, 428/75, 213, 215, 138, 457, 469, 36.91, 35.98

(56) References Cited

U.S. PATENT DOCUMENTS

| | | |
|---|---|---|
| 3,152,033 A | 10/1964 | Black et al. |
| 3,302,358 A | 2/1967 | Jackson |
| 3,799,056 A | 3/1974 | Colignon |
| 3,963,547 A | 6/1976 | Kaneko et al. |
| 4,284,674 A | 8/1981 | Sheptak |
| 4,323,620 A | 4/1982 | Iwabuchi et al. |
| 4,359,496 A | 11/1982 | Kratel et al. |
| 4,374,687 A | 2/1983 | Yamamoto |
| 4,375,493 A | 3/1983 | George et al. |
| 4,381,716 A | 5/1983 | Hastings et al. |
| 4,444,821 A | 4/1984 | Young et al. |
| 4,581,285 A | 4/1986 | Mahefkey, Jr. |
| 4,726,974 A | 2/1988 | Nowobilski et al. |
| 4,745,015 A | 5/1988 | Cheng et al. |
| 4,877,689 A | 10/1989 | Onstott |
| 5,018,328 A | 5/1991 | Cur et al. |
| 5,030,518 A | 7/1991 | Keller |
| 5,038,693 A | 8/1991 | Kourtides et al. |
| 5,080,306 A | 1/1992 | Porter et al. |
| 5,143,770 A | 9/1992 | Gonczy et al. |
| 5,175,975 A | 1/1993 | Benson et al. |
| 5,178,921 A | 1/1993 | Whelan |
| 5,224,832 A | 7/1993 | Gonczy et al. |
| 5,252,408 A | 10/1993 | Bridges et al. |
| 5,256,858 A | 10/1993 | Tomb |
| 5,271,980 A | 12/1993 | Bell |
| 5,277,959 A | 1/1994 | Kourtides et al. |
| 5,304,408 A | 4/1994 | Jarosz et al. |
| 5,376,424 A | 12/1994 | Watanabe |
| 5,386,706 A | 2/1995 | Bergsten et al. |
| 5,500,305 A | 3/1996 | Bridges et al. |
| 5,508,106 A | 4/1996 | Yoshino |
| 5,549,956 A | 8/1996 | Handwerker |
| 5,877,100 A * | 3/1999 | Smith .......................... 501/12 |

FOREIGN PATENT DOCUMENTS

| | | |
|---|---|---|
| EP | 480 707 | 4/1992 |
| GB | 2 025 320 | 1/1980 |
| WO | WO 99/367285 | 7/1999 |

OTHER PUBLICATIONS

Perry, Robert H. & Green, Don W. (ed.), "Storage Systems," *Chemical Engineer's Handbook* 6$^{th}$ Edition, 12–55—12–58 (1984).

* cited by examiner

*Primary Examiner*—Nasser Ahmad

(57) ABSTRACT

The present invention is an insulating composite comprising (a) a first thermally reflective layer having a reflective surface and an opposite surface, (b) a second thermally reflective layer having a reflective surface and an opposite surface, and (c) a porous metal oxide film having a thickness of 20 $\mu$m or less that is positioned between the first and second thermally reflective layers such that there is substantially no direct physical contact (thermal bridging) between the first and second thermally reflective layers. The present invention further includes an insulating element in which the insulating composite is disposed within an air-impermeable container.

20 Claims, No Drawings

THERMALLY REFLECTIVE LAYER-POROUS METAL OXIDE FILM INSULATION COMPOSITE

TECHNICAL FIELD OF THE INVENTION

The present invention relates to an insulation composite and, more particularly, a multilayer insulation composite.

BACKGROUND OF THE INVENTION

A common type of insulation is multilayer insulation, which is especially useful for cryogenic applications. Multilayer insulation typically consists of alternating layers of highly reflecting material, such as aluminum foil or aluminized polyester (e.g., Mylar) film, and a low-conductivity spacer material or insulator, such as fiberglass mat or paper, glass fabric, or nylon net. Between twenty and forty such layers are commonly used for cryogenic applications including, for example, laboratory dewars, piping, on-site storage vessels, and transportation vessels (e.g., as part of tank trucks). In addition, multilayer insulation is advantageously kept under a high vacuum, thereby further enhancing the insulating properties of the multilayer insulation. Multilayer insulation has a very low heat transfer due to the fact that all modes of heat transfer—conductive, convective, and radiative—are minimized. The multiple layers of reflecting material have a low emissivity and, thereby, inhibit radiative heat transfer. Convective heat transfer is inhibited by lowering the pressure (i.e., creating a vacuum) between the insulation layers. Finally, the presence of spacer material inhibits conductive heat transfer through thermal short-circuits (physical contact) that might otherwise exist between the layers of reflecting material.

Despite the satisfactory performance of conventional multilayer insulation composites in many applications, there remains a need for an improved multilayer insulation composite. The present invention seeks to provide such a multilayer insulation composite, particularly a multilayer insulation composite that provides satisfactory, if not superior, thermal performance, preferably with a reduced overall mass and/or thickness. These and other objects and advantages of the present invention, as well as additional inventive features, will be apparent from the description of the invention provided herein.

BRIEF SUMMARY OF THE INVENTION

The present invention is an insulating composite comprising (a) a first thermally reflective layer having a reflective surface and an opposite surface, (b) a second thermally reflective layer having a reflective surface and an opposite surface, and (c) a porous metal oxide film having a thickness of 20 $\mu$m or less that is positioned between the first and second thermally reflective layers such that there is substantially no direct physical contact (thermal bridging) between the first and second thermally reflective layers. The present invention further includes an insulating element in which the insulating composite is disposed within an air-impermeable container.

DESCRIPTION OF THE PREFERRED EMBODIMENTS

The present invention provides an insulating composite having at least two thermally reflective layers with a porous metal oxide film positioned therebetween.

Any material that is effective in inhibiting radiative heat transfer can be used as the thermally reflective layer. Typically, such materials will have a reflective (e.g., polished) surface. The thermally reflective material preferably is characterized by a low emissivity. Also, the thermally reflective material typically will be in the form of a sheet or strip. Thus, the thermally reflective layer generally will have a reflective surface and an opposite surface. Suitable thermally reflective layers include, for example, aluminum foil. Other suitable thermally reflective layers include polymeric (e.g., polyester, polyamide, polyimide, or polyolefin) substrates having aluminum deposited on one or both surfaces thereof. Such a thermally reflective layer is commercially available as aluminized polyester (e.g., Mylar) film. Other thermally reflective materials having a low emissivity, such as gold and silver, can be deposited instead of aluminum on the aforementioned substrates in certain applications. The thermally reflective layer can have any suitable thickness, preferably about 10–100 $\mu$m.

The thermally reflective layers can be the same or different. In particular, each thermally reflective layer can be constructed of the same or different material, and in the same or different manner, as other thermally reflective layers. In a preferred embodiment, all of the thermally reflective layers (e.g., the first and second thermally reflective layers) are aluminum foil, which is polished at least on one side.

The insulating composite of the present invention can further include additional thermally reflective layers, e.g., third, fourth, fifth, etc. thermally reflective layers. The discussion herein of the "first" and "second" thermally reflective layers is equally applicable to these additional (e.g., "third," "fourth," "fifth," etc.) thermally reflective layers. Thus, the present inventive insulating composite can comprise successive layers of a thermally reflective material having a reflective surface and an opposite surface, such that the porous metal oxide film separates the layers of thermally reflective material. Because radiant-heat transfer is inversely proportional to the number of thermally reflective layers and directly proportional to the emissivity of these layers, radiant-heat transfer is minimized by using multiple layers of a low-emissivity thermally reflective material.

Any suitable porous metal oxide film (i.e., a porous continuous sheet or expanse of metal oxide) can be used in the insulating composite of the present invention consistent with ensuring that there is substantially no direct physical contact (thermal bridging) between the first and second thermally reflective layers, preferably between any of the thermally reflective layers, and that optimally there is no direct physical contact (thermal bridging) at all between the first and second thermally reflective layers, ideally between any of the thermally reflective layers. The porous metal oxide film most preferably is substantially coextensive or entirely coextensive with at least one of the first and second thermally reflective layers, and preferably, in some embodiments, both of the first and second (or even all of the) thermally reflective layers.

The porous metal oxide film can comprise any suitable type of metal oxide, such as, for example, silica, alumina, titania, zirconia, ceria, and magnesia. The metal oxide preferably is silica, such as, for example, fumed (or pyrogenic) silica, precipitated silica, silica aerogel, and silica xerogel, with fumed silica being particularly preferred. The metal oxide can be in the form of discrete individual particles, which can be in aggregated or non-aggregated form.

The porous metal oxide film can have any suitable density, typically about 2 g/cm$^3$ or less (e.g., about 0.1–1.5 g/cm$^3$), preferably about 1 g/cm$^3$ or less (e.g., about 0.1–0.8 g/cm$^3$), and most preferably about 0.7 g/cm$^3$ or less (e.g., about 0.1–0.5 g/cm$^3$). It is preferred that the porous metal oxide film have as low a density as possible inasmuch as lower densities generally provide improved thermal performance of the present inventive insulating composite.

The porous metal oxide film has a thickness of about 20 μm or less, preferably about 10 μm or less. The porous metal oxide film more preferably has a thickness of about 5 μm or less, most preferably about 1 μm or less, although typically at least about 200 nm (e.g., about 200 nm to about 1 μm). It is preferred that the porous metal oxide film be as thin as possible inasmuch as thinner layers generally provide improved thermal performance of the present inventive insulating composite. The minimum spacing between the thermally reflective layers of the present inventive insulating composite is a function of the thickness of the porous metal oxide film (although, due to the nature of many thermally reflective layers which are not amenable to perfectly parallel spacing, the spacing between the layers typically will vary from the thickness of the porous metal oxide film to many times that thickness, e.g., up to about 500 μm).

The porous metal oxide film generally will not be self-supporting and preferably is adhered to one or both sides of at least one thermally reflective layer by any suitable means. Alternatively, the porous metal oxide film can be adhered to a supporting substrate, e.g., a thin film (e.g., about 1–10 μm thick) that is not a thermally reflective layer (such as a polymeric substrate, e.g., a polyester film), for ease of handling and positioning between the thermally reflective layers. In such an embodiment, the total thickness of the porous metal oxide film and supporting substrate preferably does not exceed the thickness values described above for the porous metal oxide film alone.

In one embodiment of the present invention, the insulating composite comprises first and second thermally reflective layers having reflective and opposite surfaces and a porous metal oxide film positioned therebetween which is adhered to the opposite surface of the first thermally reflective layer. In another embodiment, the opposite surface of the first thermally reflective layer faces the reflective surface of the second thermally reflective layer. In yet a further embodiment, the porous metal oxide film is adhered to the reflective surface of the second thermally reflective layer. A particularly preferred embodiment includes all of the features of the foregoing embodiments.

The porous metal oxide film can be prepared on and/or adhered to the surface of a thermally reflective layer by any suitable means. Preferably, the porous metal oxide film is deposited (e.g., electrostatically applied or dispersion coated), or prepared in situ, on the thermally reflective layer. The porous metal oxide film can be introduced from metal oxide in dry form (e.g., as a powder) or in a dispersion (e.g., with a carrier). For example, a dispersion of a metal oxide such as silica in a suitable carrier, such as water and/or alcohol, is deposited, e.g., by spraying or brushing, onto the substrate, preferably the thermally reflective layer, and then the carrier is evaporated, thereby leaving a porous metal oxide film. To ensure satisfactory formation of a metal oxide film, a suitable surfactant can be added to the metal oxide dispersion prior to deposition onto the substrate. The metal oxide dispersion also can contain an additive to control the pH of the metal oxide dispersion inasmuch as the pH can have an effect on the adhesiveness of the metal oxide particles to each other and the resulting density of the porous metal oxide film. A thicker porous metal oxide film can be formed by depositing additional metal oxide dispersion on top of the already formed porous metal oxide film and repeating the formation process any number of additional times, e.g., 2, 3, 4, or more times until the desired thickness of the porous metal oxide film is achieved.

The metal oxide utilized to form the porous metal oxide film can have any suitable physical characteristics. The metal oxide can be in the form of discrete individual particles, which can be in aggregated or non-aggregated form. The metal oxide can have any suitable discrete individual particle diameter, typically about 5 nm or more, and preferably about 5–20 nm. The metal oxide similarly can have any suitable aggregate particle diameter, typically about 500 nm or less. The metal oxide can have any suitable surface area, typically about 50 m$^2$/g or more, preferably about 100 m$^2$/g or more, and more preferably about 200 m$^2$/g or more, or even about 300 m$^2$/g or more. The surface area is calculated based on the amount of nitrogen adsorbed at five different relative pressures over the range 0.05 to 0.25 according to the Brunauer-Emmett-Teller (BET) model, which is referenced in Gregg, S. J. and Sing, K. S. W, "Adsorption, Surface Area and Porosity," p. 285, Academic Press, New York (1991).

A suitable binder can be utilized in conjunction with the preparation of the porous metal oxide film, although its use is not preferred. If a binder is used, however, an inorganic binder is preferred, particularly sodium silicate. The binder can be used in a variety of manners. For example, the binder can be applied to one of the surfaces of the thermally reflective layer (preferably the surface opposite the reflective surface thereof), with the metal oxide dispersion being subsequently deposited onto the binder. Alternatively, the binder can be mixed into the metal oxide dispersion, and then the mixture can be deposited onto the surface of the thermally reflective layer.

Other additives can be present in the insulating composite of the present invention. For example, hydrogen and water getters can be used. As with the porous metal oxide film, these additional components can be either loosely present in the insulating composite between one or more thermally reflective layers or adhered to one or more thermally reflective layers. One suitable method of incorporating such additives into the present inventive insulating composite is to mix the additives with the metal oxide dispersion, which then can be applied to the surface of one or more thermally reflective layers.

In order to facilitate the handling of the present inventive insulating composite, particularly when many layers are utilized, and/or to provide a measure of protection to the present inventive insulating composite, an outer or cover layer can be used in conjunction with the present inventive insulating composite. Such an outer or cover layer is optional.

The insulating composite of the present invention can be used to insulate any suitable item. The insulating composite of the present invention can be applied directly to the surface for which insulation is desired. For example, the insulating composite can be placed directly on the outer surface of dewars, piping, storage vessels, and transportation vessels (e.g., the tanks of tank trucks). Multiple sheets or strips of thermally reflective layers can be applied to surfaces to produce a multilayer insulating composite in accordance with the present invention. Alternatively, sheets or strips of the present inventive insulating composite can be wrapped around the surface to be insulated, such as pipes or tanks. Separate individual sheets or strips can be used to-wrap surfaces or one continuous sheet or strip can be wound around surfaces, for example, such that the insulating composite has a spiral-shaped configuration.

Depending upon the particular application, the reflective surface of the thermally reflective layer can face toward or away from the surface to be insulated. In insulating composites having more than one thermally reflective layer, all of the reflective surfaces preferably face the same direction. In applications where it is desired to keep a surface at a cooler temperature than the surrounding environment (e.g., cryogenic applications), the reflective surfaces preferably face away from the cooler surface. This configuration minimizes radiative heat transfer from the warmer environment to the cooler surface. Alternatively, in applications where it is desired to keep a surface at a warmer temperature than the surrounding environment (e.g., process piping for hot fluids), the reflective surface preferably face toward the warmer surface. This configuration minimizes radiative heat transfer from the warmer surface to the cooler environment.

The insulating composite of the present invention can be disposed within a container to form an insulating element. The container can be any suitable container, for example, a container prepared from a polymeric material. In some embodiments, the container desirably is an air-impermeable container. The insulating element containing the insulating composite can be utilized in the same manner as the insulating composite itself, e.g., applied to the outer surface of an item requiring insulation, e.g., a storage vessel. The container also can have suitable dimensions to contain both the insulating composite and the item requiring insulation itself, e.g., a storage vessel.

The use of an air-impermeable container permits the insulating composite disposed within to be subjected to a pressure below atmospheric pressure, which results in the reduction of heat transfer, by conduction. The lower pressure is attained by establishing a vacuum within the air-impermeable container, which can be done using conventional vacuum equipment. The pressure within the air-impermeable container preferably is about $10^{-1}$ kPa (1 torr) or less, more preferably about $10^{-2}$ kPa ($10^{-1}$ torr) or less, and most preferably about $10^{-4}$ kPa ($10^{-3}$ torr) or less. Optimally, the pressure within the air-impermeable container is even lower, e.g., about $10^{-6}$ kPa ($10^{-5}$ torr) or less, or even about $10^{-8}$ kPa ($10^{-7}$ torr) or less.

The insulating composite and insulating element of the present invention are suitable for use as insulators in a wide variety of applications over a wide variety of temperatures. For example, the inventive insulating composite can be used for cryogenic applications such as laboratory dewars, process piping, storage vessels, and transportation vessels. Additionally, the insulating composites disclosed herein can be used in superconducting magnet applications as disclosed in U.S. Pat. No. 5,143,770. In addition to cryogenic applications, insulating composites and insulating elements of the present invention can be used in extremely high temperature applications such as, for example, aerospace vehicles, firemen's suits, and industrial tools.

The following examples further illustrate the present invention but, of course, should not be construed as in any way limiting its scope.

EXAMPLE 1

This example illustrates the preparation of a porous metal oxide film on a thermally reflective layer using a variety of metal oxide compositions.

Several high surface area (380 m²/g) silica particulate sols were prepared by mixing, while stirring, 100 ml Cab-O-Sperse® LT-121 silica (20% solids content, Cabot Corporation, Cab-O-Sil Division, Tuscola, Ill.) with 100 ml deionized water, either alone (sol A) or with 10.5 ml 1-propanol (sol B), 10.5 ml 1-butanol (sol C), 1 ml of a 10 wt.% solution of Fluorad FC170C surfactant (3M Industrial Chemical Products Division, St. Paul, Minn. (sol D), and 0.1 ml of a 10 wt.% solution of Fluorad FC170C surfactant (sol E). The resulting sols had solids contents of approximately 10–11%. Each sol was deposited onto two or three 10 cm (4 inch) wide, 61 cm (24 inch) long strips of 6.25 μm thick thermally reflective layers of aluminum foil having a polished reflective side and an opposite matte (lower reflective) side. Each sol also was deposited onto a separate 10 cm (4 inch) blank silicon wafer for ellipsometric characterization of refractive index. The deposition of the sol was carried out by brushing on a coating of the sol with a 10 cm (4 inch) wide sponge brush, wet with the sol, in a single pass onto the matte side of the thermally reflective layers and the silicon wafer at a rate of about 25 cm/min (10 inch/min).

After deposition on the thermally reflective layers and silicon wafer, the sol was dried under ambient conditions to form a porous metal oxide film on each of the thermally reflective layers (i.e., to form two or three coated strips using each sol) and the silicon wafer (for each of the sols). The second and third strips (for each sol) had a second coat deposited onto the first coating and were again allowed to dry to form a thicker porous metal oxide film on the thermally reflective layers. The third strip (which was only used with sol A) was coated a third time and allowed to dry to form yet a thicker porous metal oxide film on the thermally reflective layer. Some cracking and delamination of small areas of the porous metal oxide film during the drying of the second and third coats was observed on the second and third coated strips, respectively, for each sol.

Each strip comprising a thermally reflective layer with a porous metal oxide film thereon was cut into 10 cm (4 inch) squares, and two of these squares from each of the strips were weighed along with an uncoated square (i.e., a thermally reflective layer without a porous metal oxide film thereon). The average weight gain from the porous metal oxide film is set forth in Table 1 below for each of the coated strips (i.e., for each of the thermally reflective layers with one, two, or three coats of the metal oxide).

The porous metal oxide film on each silicon wafer was analyzed using ellipsometry to determine its refractive index. The average index of refraction was found to be 1.107 (sol A), 1.125 (sol B), 1.093 (sol C), 1.125 (sol D), and 1.121 (sol E), which corresponds to a density of 0.52, 0.60, 0.45, 0.60, and 0.58 g/cm³, respectively, for a porous silica layer. This density was used to calculate the thickness of the porous metal oxide film of each of the coated strips for the various sols, and these thicknesses are set forth in Table 1 below.

TABLE 1

| Sol | Number of Coats | Average Weight (g) | Density (g/cm³) | Thickness (μm) |
|---|---|---|---|---|
| A | 1 | 0.0041 | 0.52 | 0.76 |
| A | 2 | 0.0109 | 0.52 | 2.03 |
| A | 3 | 0.0188 | 0.52 | 3.50 |
| B | 1 | 0.0042 | 0.60 | 0.68 |
| B | 2 | 0.0099 | 0.60 | 1.60 |
| C | 1 | 0.0075 | 0.45 | 1.61 |
| C | 2 | 0.0113 | 0.45 | 2.43 |
| D | 1 | 0.0065 | 0.60 | 1.05 |
| D | 2 | 0.0172 | 0.60 | 2.78 |
| E | 1 | 0.0050 | 0.58 | 0.84 |
| E | 2 | 0.0084 | 0.58 | 1.40 |

The data in Table 1 demonstrate that a porous metal oxide film can be applied to a thermally reflective layer. In addition, the thickness of the porous metal oxide film on the thermally reflective layer can be effectively controlled.

EXAMPLE 2

This example illustrates the preparation of a porous metal oxide film on a thermally reflective layer using a high surface area metal oxide particulate sol.

A high surface area (380 m$^2$/g) silica particulate sol was prepared by mixing, while stirring, 100 ml Cab-O-Sperse® LT-121 silica (20w solids content, Cabot Corporation, Cab-O-Sil Division, Tuscola, Ill.) with 120 ml deionized water. The resulting sol had a solids content of approximately 8.6%.

The sol was deposited onto two 10 cm (4 inch) wide, 61 cm (24 inch) long strips of 6.25 μm thick thermally reflective layers of aluminum foil having a polished reflective side and an opposite matte (lower reflective) side. The sol also was deposited onto a separate 10 cm (4 inch) blank silicon wafer for ellipsometric characterization of refractive index. The deposition of the sol was carried out by brushing on a coating of the sol with a 10 cm (4 inch) wide sponge brush, wet with the sol, in a single pass onto the matte side of the thermally reflective layers and the silicon wafer at a rate of about 25 cm/min (10 inch/min).

After deposition on the thermally reflective layers and silicon wafer, the sol was dried under ambient conditions to form a porous metal oxide film on each of the thermally reflective layers (i.e., to form two coated strips) and the silicon wafer. The second strip had a second coat deposited onto the first coating and was again allowed to dry to form a thicker porous metal oxide film on the thermally reflective layer.

Each strip comprising a thermally reflective layer with a porous metal oxide film thereon was cut into 10 cm (4 inch) squares, and two of these squares from each of the strips were weighed along with an uncoated square (i.e., a thermally reflective layer without a porous metal oxide film thereon). The average weight gain from the porous metal oxide film is set forth in Table 2 below for each of the coated strips (i.e., for each of the thermally reflective layers with one or two coats of the metal oxide).

The porous metal oxide film on the silicon wafer was analyzed using ellipsometry to determine its refractive index. The average index of refraction was found to be 1.115, which corresponds to a density of 0.55 g/cm$^3$ for a porous silica layer. This density was used to calculate the thickness of the porous metal oxide films of each of the coated strips, and these thicknesses are set forth in Table 2 below.

TABLE 2

| Number of Coats | Average Weight (g) | Density (g/cm$^3$) | Thickness (μm) |
|---|---|---|---|
| 1 | 0.0038 | 0.55 | 0.67 |
| 2 | 0.0082 | 0.55 | 1.44 |

The data in Table 2 demonstrate that a porous metal oxide film can be applied to a thermally reflective layer using a high surface area metal oxide particulate sol. In addition, the thickness of the porous metal oxide film on the thermally reflective layer can be effectively controlled.

EXAMPLE 3

This example illustrates the preparation of a porous metal oxide film on a thermally reflective layer using metal oxide spheres.

The procedure of Example 2 was repeated except that the silica particulate sol of Example 2 was replaced with a colloidal dispersion of 75 nm silica spheres, with a nominal solids content of 40%, commercially available as Nalco 2329 (Nalco, Naperville, Ill.).

Two thermally reflective layers and a silicon wafer were treated as recited in Example 2. The porous metal oxide film on the silicon wafer was analyzed using ellipsometry to determine its refractive index. The average index of refraction was found to be 1.256, which corresponds to a density of 1.22 g/cm$^3$ for a porous silica layer. This density was used to calculate the thickness of the porous metal oxide films of each of the coated strips, and these thicknesses are set forth in Table 3 below.

TABLE 3

| Number of Coats | Average Weight (g) | Density (g/cm$^3$) | Thickness (μm) |
|---|---|---|---|
| 1 | 0.0117 | 1.22 | 1.13 |
| 2 | 0.0275 | 1.22 | 2.66 |

The data in Table 3 demonstrate that a porous metal oxide film can be applied to a thermally reflective layer using metal oxide spheres. In addition, the thickness of the porous metal oxide film on the thermally reflective layer can be effectively controlled.

EXAMPLE 4

This example illustrates the preparation of a porous metal oxide film on a thermally reflective layer using a low surface area metal oxide particulate sol.

The procedure of Example 2 was repeated except that the silica particulate sol was prepared from 83.64 ml Cab-O-Sperse® SC-1 silica (90 m$^2$/g surface area) (30% solids content, Cabot Corporation, Cab-O-Sil Division, Tuscola, Ill.) and 50 ml deionized water which had been adjusted to pH 10.5 with sodium hydroxide, to yield a solids content of approximately 20%.

Two thermally reflective layers and a silicon wafer were treated as recited in Example 2. The porous metal oxide film on the silicon wafer was analyzed using ellipsometry to determine its refractive index. The average index of refraction was found to be 1.117, which corresponds to a density of 0.56 g/cm$^3$ for a porous silica layer. This density was used to calculate the thickness of the porous metal oxide films of each of the coated strips, and these thickness e s are set forth in Table 4 below.

TABLE 4

| Number of Coats | Average Weight (g) | Density (g/cm$^3$) | Thickness (μm) |
|---|---|---|---|
| 1 | 0.0206 | 0.56 | 3.56 |
| 2 | 0.0405 | 0.56 | 7.01 |

The data in Table 4 demonstrate that a porous metal oxide film can be applied to a thermally reflective layer using a low surface area metal oxide particulate sol. In addition, the thickness of the porous metal oxide film on the thermally reflective layer can be effectively controlled.

EXAMPLE 5

This example illustrates the preparation of a porous metal oxide film on a thermally reflective layer using a low surface area metal oxide particulate sol.

The procedure of Example 2 was repeated except that the silica particulate sol was prepared from 83.64 ml Cab-O-

Sperse® SC-1 silica (90 m²/g surface area) (30% solids content, Cabot Corporation, Cab-O-Sil Division, Tuscola, Ill.) and 100 ml deionized water which had been adjusted to pH 10.5 with sodium hydroxide, to yield a solids content of approximately 15%.

Two thermally reflective layers and a silicon wafer were treated as recited in Example 2. The porous metal oxide film on the silicon wafer was analyzed using ellipsometry to determine its refractive index. The average index of refraction was found to be 1.117, which corresponds to a density of 0.56 g/cm³ for a porous silica layer. This density was used to calculate the thickness of the porous metal oxide films of each of the coated strips, and these thicknesses are set forth in Table 5 below.

TABLE 5

| Number of Coats | Average Weight (g) | Density (g/cm³) | Thickness (μm) |
|---|---|---|---|
| 1 | 0.0123 | 0.56 | 2.13 |
| 2 | 0.0178 | 0.56 | 3.08 |

The data in Table 5 demonstrate that a porous metal oxide film can be applied to a thermally reflective layer using a low surface area metal oxide particulate sol. In addition, the thickness of the porous metal oxide film on the thermally reflective layer can be effectively controlled.

EXAMPLE 6

This example illustrates the preparation of a porous metal oxide film on a polymeric surface.

The procedure of Example 2 was repeated except that the silica particulate sol recited in Example 5 was used in conjunction with a 25.4 μm thick polyester (Mylar) film rather than a 6.25 μm thick aluminum foil.

Two such polyester layers and a silicon wafer were treated as recited in Example 2. The porous metal oxide film on the silicon wafer was analyzed using ellipsometry to determine its refractive index. The average index of refraction was found to be 1.117, which corresponds to a density of 0.56 g/cm³ for a porous silica layer. This density was used to calculate the thickness of the porous metal oxide films of each of the coated strips, and these thicknesses are set forth in Table 6 below.

TABLE 6

| Number of Coats | Average Weight (g) | Density (g/cm³) | Thickness (μm) |
|---|---|---|---|
| 1 | 0.0143 | 0.56 | 2.47 |
| 2 | 0.0290 | 0.56 | 5.02 |

The data in Table 6 demonstrate that a porous metal oxide film can be applied to a polymeric surface. In addition, the thickness of the porous metal oxide film on the polymeric surface can be effectively controlled.

EXAMPLE 7

This example illustrates the preparation of a porous metal oxide film on a thermally reflective layer using a low surface area fumed metal oxide.

The procedure of Example 2 was repeated except that the silica particulate sol was prepared from 22 g Cab-O-Sil® L-90 fumed silica (90 m²/g surface area) (Cabot Corporation, Cab-O-Sil Division, Tuscola, Ill.) and 110 ml deionized water which had been adjusted to pH 10.1 with ammonium hydroxide (28–30%), to yield a solids content of approximately 16.7%. After the fumed silica was added to the pH-adjusted deionized water, further ammonium hydroxide (about 50 drops) was added to the sol to adjust the pH of the sol to 10.03.

One thermally reflective layer and a silicon wafer were treated as recited in Example 2. The porous metal oxide film on the silicon wafer was analyzed using ellipsometry to determine its refractive index. The average index of refraction was found to be 1.117, which corresponds to a density of 0.56 g/cm³ for a porous silica layer. This density was used to calculate the thickness of the porous metal oxide film of the coated strip, and this thickness is set forth in Table 7 below.

TABLE 7

| Number of Coats | Average Weight (g) | Density (g/cm³) | Thickness (μm) |
|---|---|---|---|
| 1 | 0.0280 | 0.65 | 4.17 |

The data in Table 7 demonstrate that a porous metal oxide film can be applied to a thermally reflective layer using a low surface area fumed metal oxide.

EXAMPLE 8

This example illustrates the preparation of a porous metal oxide film on a thermally reflective layer using a high surface area fumed metal oxide.

The procedure of Example 2 was repeated except that the silica particulate sol was prepared from 20 g Cab-O-Sil® EH-5 fumed silica (380 m²/g surface area) (Cabot Corporation, Cab-O-Sil Division, Tuscola, Ill.) and 200 ml deionized water which had been adjusted to pH 10.05 with ammonium hydroxide (28–30%), to yield a solids content of approximately 9%. After the fumed silica was added to the pH-adjusted deionized water, further ammonium hydroxide (about 10 drops) was added to the sol to adjust the pH of the sol to 10.07.

One thermally reflective layer and a silicon wafer were treated as recited in Example 2. The porous metal oxide film on the silicon wafer was analyzed using ellipsometry to determine its refractive index. The average index of refraction was found to be 1.085, which corresponds to a density of 0.40 g/cm³ for a porous silica layer. This density was used to calculate the thickness of the porous metal oxide film of the coated strip, and this thickness is set forth in Table 8 below.

TABLE 8

| Number of Coats | Average Weight (g) | Density (g/cm³) | Thickness (μm) |
|---|---|---|---|
| 1 | 0.0025 | 0.40 | 0.61 |

The data in Table 8 demonstrate that a porous metal oxide film can be applied to a thermally reflective layer using a high surface area fumed metal oxide.

EXAMPLE 9

This example illustrates the preparation of a porous metal oxide film on a thermally reflective layer using a high surface area fumed metal oxide.

The procedure of Example 2 was repeated except that the silica particulate sol was prepared from 40 g Cab-O-Sil®

EH-5 fumed silica (380 m²/g surface area) (Cabot Corporation, Cab-O-Sil Division, Tuscola, Ill.) and 400 ml deionized water which had been adjusted to pH 1.0 with concentrated nitric acid (69–70%), to yield a solids content of approximately 9%. After the fumed silica was added to the pH-adjusted deionized water, further concentrated nitric acid (approximately 0.5 ml) was added to the sol to adjust the pH of the sol to 0.97.

One thermally reflective layer and a silicon wafer were treated as recited in Example 2. The porous metal oxide film on the silicon wafer was analyzed using ellipsometry to determine its refractive index. The average index of refraction was found to be 1.061, which corresponds to a density of 0.26 g/cm³ for a porous silica layer. This density was used to calculate the thickness of the porous metal oxide film of the coated strip, and this thickness is set forth in Table 9 below.

TABLE 9

| Number of Coats | Average Weight (g) | Density (g/cm³) | Thickness (μm) |
| --- | --- | --- | --- |
| 1 | 0.0082 | 0.26 | 3.06 |

The data in Table 9 demonstrate that a porous metal oxide film can be applied to a thermally reflective layer using a high surface area fumed metal oxide.

EXAMPLE 10

This example illustrates the preparation of a porous metal oxide film on a thermally reflective layer in conjunction with metal oxide spheres.

The procedure of Example 2 was repeated except that the silica particulate sol was prepared from 83.64 ml Cab-O-Sperse® SC-1 silica (90 m²/g surface area) (30% solids content, Cabot Corporation, Cab-O-Sil Division, Tuscola, Ill.) and 100 ml deionized water which had been adjusted to pH 10.5 with sodium hydroxide, to yield a solids content of approximately 15%.

One thermally reflective layer and a silicon wafer were treated as recited in Example 2. The coated strip then had a second coating deposited onto the first coating, and, while the second coat was wet, approximately 30 g SIP 22 synthetic amorphous precipitated silica spheres (Degussa Corporation, Ridgefield Park, N.J.) were sprinkled onto the surface of the second coat. The coated strip was again allowed to dry at ambient conditions for 10 minutes.

The coated strip then was gently lifted, and the excess precipitated silica spheres were dumped off of the strip. The strip was cut into 10 cm (4 inch) squares, and two of these squares were weighed along with an uncoated square. The average weight gain of the metal oxide film with two coats was subtracted out (this information was taken from Example 5), leaving the average weight gain from merely the precipitated silica spheres. Assuming a uniform particle size of 100 μm and a uniform particle distribution, the weight gain on the 10×10 cm (4×4 inch) square of 0.0129 g yields a particle density on the surface of approximately 795 particles/cm².

These results demonstrate that a porous metal oxide film can be applied to a thermally reflective layer in conjunction with discrete metal oxide particles.

EXAMPLE 11

This example illustrates the preparation of a porous metal oxide film on a thermally reflective layer in conjunction with aerogel beads.

The procedure of Example 2 was repeated except that the silica particulate sol was prepared from 83.64 ml Cab-O-Sperse™ SC-1 silica (90 m²/g) (30% solids content, Cabot Corporation, Cab-O-Sil Division, Tuscola, Ill.) and 100 ml deionized water which had been adjusted to pH 10.5 with sodium hydroxide, to yield a solids content of approximately 15%.

One thermally reflective layer and a silicon wafer were treated as recited in Example 2. The coated strip then had a second coating deposited onto the first coating, and, while the second coat was wet, approximately 15 g hydrophilic aerogel beads (596 m²/g surface area; 1.0±0.5 mm particle diameter; 84 kg/m tap density) (supplied by Cabot Corporation, Cab-O-Sil Division, Tuscola, Ill.) were sprinkled onto the surface of the second coat. The coated strip was again allowed to dry at ambient conditions for 10 minutes.

The coated strip then was gently lifted, and the excess aerogel beads were dumped off of the strip. The strip was cut into 10 cm (4 inch) squares, and two of these squares were weighed along with an uncoated square. Many of the beads fell or broke off of the strip at this time. The average weight gain of the metal oxide film with two coats was subtracted out (this information was taken from Example 5), leaving the average weight gain from merely the particles. Assuming a uniform particle size of 1 mm and a uniform particle distribution, the weight gain on the 10×10 cm (4×4 inch) square of 0.0046 g yields a particle density on the surface of approximately 0.65 particles/cm².

These results demonstrate that a porous metal oxide film can be applied to a thermally reflective layer in conjunction with aerogel particles.

All of the references cited herein are hereby incorporated in their entireties by reference.

While this invention has been described with an emphasis upon preferred embodiments, it will be obvious to those of ordinary skill in the art that variations of the preferred embodiments may be used and that it is intended that the invention may be practiced otherwise than as specifically described herein. Accordingly, this invention includes all modifications encompassed within the spirit and scope of the invention as defined by the following claims.

What is claimed is:

1. An insulating composite comprising
    (a) a first thermally reflective layer having a reflective surface and an opposite surface,
    (b) a second thermally reflective layer having a reflective surface and an opposite surface, and
    (c) a porous metal oxide film having a thickness of 20 μm or less that is positioned between said first and second thermally reflective layers such that there is no direct physical contact between said first and second thermally reflective layers.

2. The insulating composite of claim 1, wherein said porous metal oxide film is substantially coextensive with said first and second thermally reflective layers.

3. The insulating composite of claim 2, wherein said porous metal oxide film is adhered to the opposite surface of said first thermally reflective layer.

4. The insulating composite of claim 3, wherein the opposite surface of said first thermally reflective layer faces the reflective surface of said second thermally reflective layer.

5. The insulating composite of claim 4, wherein said porous metal oxide film is adhered to the reflective surface of said second thermally reflective layer.

6. The insulating composite of claim 1, wherein said first and second thermally reflective layers are aluminum foil.

7. The insulating composite of claim 1, wherein said porous metal oxide film has a density of about 2 g/cm$^3$ or less.

8. The insulating composite of claim 1, wherein said porous metal oxide film is a porous silica film.

9. The insulating composite of claim 1, wherein said porous metal oxide film has a thickness of about 10 μm or less.

10. The insulating composite of claim 9, wherein said porous metal oxide film has a thickness of about 200 nm to about 10 μm.

11. An insulating element comprising an air-impermeable container and the insulating composite of claim 1 disposed therein.

12. The insulating element of claim 11, wherein the pressure within said container is about $10^{-2}$ kPa or less.

13. An insulating element comprising an air-impermeable container and the insulating composite of claim 3 disposed therein.

14. The insulating element of claim 13, wherein the pressure within said container is about $10^{-2}$ kPa or less.

15. An insulating element comprising an air-impermeable container and the insulating composite of claim 8 disposed therein.

16. The insulating element of claim 15, wherein the pressure within said container is about $10^{-2}$ kPa or less.

17. An insulating element comprising an air-impermeable container and the insulating composite of claim 9 disposed therein.

18. The insulating element of claim 17, wherein the pressure within said container is about $10^{-2}$ kPa or less.

19. An insulating element comprising an air-impermeable container and the insulating composite of claim 10 disposed therein.

20. The insulating element of claim 19, wherein the pressure within said container is about $10^{-2}$ kPa or less.

* * * * *